Nov. 13, 1956  H. HILBER  2,770,479
CYCLE SADDLE SUPPORT MOUNTING
Filed Sept. 18, 1952

Inventor:
Hanns Hilber

United States Patent Office 2,770,479
Patented Nov. 13, 1956

2,770,479

CYCLE SADDLE SUPPORT MOUNTING

Hanns Hilber, Stuttgart, Germany, assignor to Alfred Kreidler, Stuttgart, Germany Application September 18, 1952, Serial No. 310,216

Claims priority, application Germany October 29, 1951

2 Claims. (Cl. 287—119)

The present invention concerns a device for mounting the saddle support in the saddle tube of a bicycle or motor-cycle frame.

It is known to slit the upper end of the saddle tube on bicycles and to press it together by a bolt passing through a pair of lugs for the purpose of clamping the saddle support thereto. Further, it is known to secure the upper fork of the rear wheel to the frame by the same bolt. The sudden transition from the circular cross section to the adjoining flange may however, in such known constructions constitute a source of danger, since at that point, especially when highly stressed, cracks or even fractures may occur.

An object of the present invention is to avoid such a sudden transition and to provide a mounting for the saddle support in the saddle tube of the frame which is particularly suitable for greater stresses.

It is another object of the present invention to provide a device for mounting the saddle support in the saddle tube of a bicycle in which the saddle tube slit longitudinally for a given distance in a known manner is deformed to an oval cross section by flattening the sides, and in which the saddle support is fixed by two clamping jaws in such a manner that these, together with the saddle tube are pressed against the saddle support by a clamping bolt. Preferably, the bolt for these clamping jaws is also used for connecting the upper fork of the rear wheel to the saddle tube.

Figure 1:
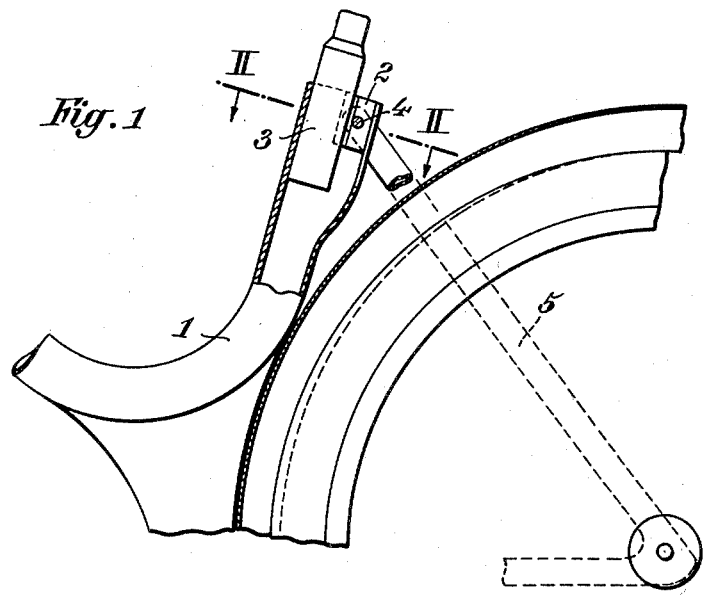
Figure 2:
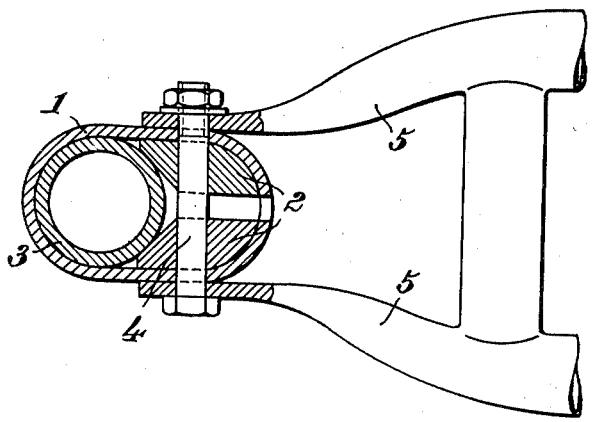

With these and other objects in view which will become apparent in the following detailed description, the present invention will be clearly understood in connection with the accompanying drawings, in which:

Figure 1 is a fragmentary side elevation of a bicycle frame, partly in section; and Figure 2 is a cross section taken on the line II—II of Fig. 1, on an enlarged scale.

The saddle tube 1 is flattened on either side to a somewhat oval cross section and is slit longitudinally for some distance at the rear. Two clamping members 2 which are intended to hold the saddle support 3 are inserted in the tube. For this purpose the screw bolt 4 is passed straight through both clamping members 2 and the saddle tube 1 by which bolt the clamping members 2 are pressed from both sides against the saddle support 3 by compressing the saddle tube 1. At the same time the clamping bolt 4 secures the connecting ends of the upper fork 5 of the rear wheel to the saddle tube 1.

While I have disclosed one embodiment of the present invention, it is to be understood that this embodiment is given by example only and not in a limiting sense, the scope of the present invention being determined by the objects and the claims.

I claim:

1. In a cycle-frame for a saddle, a saddle tube having an upper end portion of substantially oval cross section and of a configuration which has a larger dimension lengthwise than crosswise and slit longitudinally in a region adjacent its upper end, a support member for the said saddle disposed in the said saddle tube, jaw means housed within said upper end portion of the said saddle tube and presenting with said tube an opening receiving the said support member of the said saddle, the said support member of the said saddle engaging the said jaw means, and means for compressing the said saddle tube and said jaw means, whereby the said support member may be secured relative to the said saddle tube.

2. A structure, as set forth in claim 1, in which the said upper end portion of the saddle tube is of enlarged cross section relative to the cross section of the remainder of the tube.

References Cited in the file of this patent

UNITED STATES PATENTS

| | | |
|---|---|---|
| 1,258,707 | Rice | Mar. 12, 1918 |
| 1,950,947 | Mulroyan | Mar. 13, 1934 |
| 2,495,859 | Mennesson | Jan. 31, 1950 |

FOREIGN PATENTS

| | | |
|---|---|---|
| 3,897 | Great Britain | 1898 |
| 22,394 | Great Britain | 1895 |
| 403,980 | France | Oct. 7, 1909 |